United States Patent
Dagner et al.

(10) Patent No.: US 9,751,165 B2
(45) Date of Patent: *Sep. 5, 2017

(54) CONTROL METHOD FOR MILL TRAIN

(75) Inventors: Johannes Dagner, Erlangen (DE); Ansgar Grüss, Erlangen (DE)

(73) Assignee: PRIMETALS TECHNOLOGIES GERMANY GMBH, Erlangen (DE)

( * ) Notice: Subject to any disclaimer, the term of this patent is extended or adjusted under 35 U.S.C. 154(b) by 442 days.

This patent is subject to a terminal disclaimer.

(21) Appl. No.: 14/119,636

(22) PCT Filed: May 4, 2012

(86) PCT No.: PCT/EP2012/058240
§ 371 (c)(1),
(2), (4) Date: Nov. 22, 2013

(87) PCT Pub. No.: WO2012/159868
PCT Pub. Date: Nov. 29, 2012

(65) Prior Publication Data
US 2014/0088752 A1    Mar. 27, 2014

(30) Foreign Application Priority Data
May 24, 2011 (EP) ..................................... 11167290

(51) Int. Cl.
*B23P 17/00* (2006.01)
*B21B 37/58* (2006.01)

(52) U.S. Cl.
CPC .............. *B23P 17/00* (2013.01); *B21B 37/58* (2013.01); *B21B 2261/21* (2013.01); *B21B 2271/02* (2013.01)

(58) Field of Classification Search
CPC .................................. B23P 17/00; G05B 15/02
See application file for complete search history.

(56) References Cited

U.S. PATENT DOCUMENTS 3,940,598 A * 2/1976 Sekiguchi ............... B21B 37/58
700/153
4,063,076 A * 12/1977 Morooka .................. B21B 1/04
700/153
(Continued)

FOREIGN PATENT DOCUMENTS

CN 1243047 2/2000
CN 1589184 3/2005
(Continued)

OTHER PUBLICATIONS

English Abstract of Japanese Patent Publication No. 61289908, published Dec. 19, 1986.
(Continued)

*Primary Examiner* — Kenneth M Lo
*Assistant Examiner* — David Wynne
(74) *Attorney, Agent, or Firm* — Staas & Halsey LLP

(57) ABSTRACT

A current temperature is ascertained for sections of a strip ahead of a first mill stand. The temperatures of the strip sections are predicted with a prediction horizon corresponding to multiple strip sections, including when each strip section is milled in the first mill stand for which time a nip profile formed by the working rolls is predicted. A control parameter for milling a specific strip section in the first mill stand is ascertained for controlling a control device of the first mill stand. A manipulated variable curve for the control device, influencing the nip profile of a nip formed by working rolls of the first mill stand, is set for the prediction horizon and optimized for the predicted nip profile and a desired profile. The current value of the optimized manipulated variable curve corresponds to the control parameter which is fed to the control device as the manipulated variable.

13 Claims, 12 Drawing Sheets

(56) References Cited

U.S. PATENT DOCUMENTS

| | | | | |
|---|---|---|---|---|
| 4,274,273 | A | * | 6/1981 | Fapiano .................. B21B 37/74 700/153 |
| 4,648,256 | A | * | 3/1987 | Wakamiya .............. B21B 37/38 72/241.8 |
| 4,691,547 | A | * | 9/1987 | Teoh ........................ B21B 37/66 72/10.7 |
| 4,912,954 | A | * | 4/1990 | Vegter ..................... B21B 37/16 700/149 |
| 5,396,416 | A | * | 3/1995 | Berkowitz ............. F25J 3/0209 700/30 |
| 5,520,037 | A | * | 5/1996 | Sorgel ..................... B21B 37/16 72/10.3 |
| 5,651,281 | A | | 7/1997 | Seidel |
| 5,871,138 | A | * | 2/1999 | Shishido .............. B23K 13/015 228/102 |
| 5,970,765 | A | | 10/1999 | Seidel |
| 6,014,881 | A | * | 1/2000 | Imanari ................... B21B 37/32 72/201 |
| 6,860,950 | B2 | * | 3/2005 | Franz ...................... B21B 37/76 148/503 |
| 7,031,797 | B2 | * | 4/2006 | Reinschke .............. B21B 37/28 700/148 |
| 7,181,822 | B2 | | 2/2007 | Ondrovic et al. |
| 7,197,802 | B2 | | 4/2007 | Kurz et al. |
| 7,865,341 | B2 | * | 1/2011 | Borchers ................ G05B 17/02 703/2 |
| 8,185,217 | B2 | * | 5/2012 | Thiele ................... G05B 13/042 700/29 |
| 2003/0065410 | A1 | * | 4/2003 | Martin ................. G05B 13/042 700/37 |
| 2004/0025558 | A1 | * | 2/2004 | Ziegelaar ............... B21B 37/28 72/205 |
| 2004/0205951 | A1 | * | 10/2004 | Kurz ....................... B21B 37/74 29/407.05 |
| 2006/0156773 | A1 | * | 7/2006 | Kurz ....................... B21B 37/74 72/8.5 |
| 2009/0117647 | A1 | * | 5/2009 | Buddhi Srinivasa .. C12M 41/32 435/289.1 |
| 2009/0139290 | A1 | * | 6/2009 | Britanik ................. B21B 37/28 72/9.2 |
| 2009/0282884 | A1 | * | 11/2009 | Pawelski ................ B21B 37/44 72/201 |
| 2009/0326700 | A1 | * | 12/2009 | Kurz ....................... B21B 37/00 700/108 |
| 2010/0132426 | A1 | | 6/2010 | Baumgärtel et al. |
| 2011/0106512 | A1 | * | 5/2011 | Hainke .................. G05B 17/02 703/2 |
| 2013/0054003 | A1 | * | 2/2013 | Weinzierl ............... B21B 37/74 700/153 |
| 2014/0129023 | A1 | * | 5/2014 | Dagner ................... B21B 37/58 700/148 |

FOREIGN PATENT DOCUMENTS

| | | | |
|---|---|---|---|
| CN | 1887462 | | 1/2007 |
| DE | 25 54 246 A1 | | 6/1977 |
| DE | 3515429 A1 | | 11/1985 |
| DE | 40 40 360 A1 | | 6/1991 |
| DE | 101 29 565 A1 | | 1/2003 |
| DE | 101 56 008 A1 | | 6/2003 |
| DE | EP 2301685 A1 | * | 3/2011 ............ B21B 37/74 |
| EP | 0 618 020 B1 | | 10/1994 |
| EP | 0 850 704 B1 | | 7/1998 |
| EP | 1 711 868 B1 | | 5/2008 |
| EP | 2 301 685 A1 | | 3/2011 |
| EP | 1167290.3 | | 5/2013 |
| GB | 1 542 916 A1 | | 3/1979 |
| JP | 61-289908 | | 12/1986 |
| JP | 4-313412 | | 11/1992 |
| RU | 2 189 875 C2 | | 9/2002 |
| WO | 2008/043684 A1 | | 4/2008 |
| WO | 2008/145222 A1 | | 12/2008 |

OTHER PUBLICATIONS

EP Search Report for 11167290.3 dated Oct. 25, 2011.
International Search Report for PCT/EP2012/058240 dated Jul. 16, 2012.
Office Action dated Sep. 21, 2015 in corresponding Russian Patent Application No. 2013157102/02(089042) with German Translation.
Office Action dated Jul. 6, 2015 in corresponding Chinese Patent Application No. 201280024742.7.
Office Action issued Nov. 2, 2014 in corresponding Chinese Patent Application No. 201280024742.7.
Office Action dated May 18, 2016 in corresponding European Patent Application No. 12719000.7.

* cited by examiner

CONTROL METHOD FOR MILL TRAIN

CROSS REFERENCE TO RELATED APPLICATIONS

This application is the U.S. national stage of International Application No. PCT/EP2012/058240, filed May 4, 2012 and claims the benefit thereof. The International Application claims the benefits of European Application No. 11167290.3 filed on May 24, 2011, both applications are incorporated by reference herein in their entirety.

BACKGROUND

Described below is a control method for a rolling mill train, wherein an adjusting device acting on a first roll stand of the rolling mill train is controlled during rolling of strip sections taking at least one control parameter into account.

The method may be implemented using a computer program containing machine code which can be processed directly by a control computer for a rolling mill train and the processing of which by the control computer causes the control computer to carry out such a control method.

A control computer for a rolling mill train is programmed such that it carries out such a control method during ongoing operation.

Also described below is a rolling mill train for strip rolling, the rolling mill train including at least a first roll stand and being equipped with such a control computer.

Temperature fluctuations over the width and length of the strip can result in considerable malfunctions during rolling. The changing material hardness causes variations in the rolling force which can in turn lead to other roll stand reactions which, for their part, result in a change in the roll gap profile. Examples of such roll stand reactions are roll flattening, roll deflection and stand spring. Added to these are a change in the roll crowning due to contact of the work rolls with the differentially heated strip. This also affects the roll gap geometry. If such changes in the roll gap profile are not taken into account, this will result in gauge, profile and flatness defects.

The known setpoint value calculation for rolling mill trains (pass schedule calculation) can only make limited provision for temperature variations in the longitudinal direction (head, strip and tail temperature) and none at all in the strip width direction. Until now, such effects have sometimes been compensated using automatic gauge control (AGC) which at least partly corrects the setting deviations due to roll stand reaction. In addition, techniques are known in which a rolling force measurement in the first roll stand of a multi-stand rolling mill train is used for feed-forward control of the remaining stands.

Both procedures have their disadvantages. For example, automatic gauge control (AGC) cannot react to variations in the temperature profile across the width of the strip. Above all, any asymmetry in material strength (e.g. caused by a temperature wedge) and, associated therewith, any roll stand reaction asymmetry is not taken into account. Furthermore, variation of the roll crown cannot be detected or can only be detected with a delay. Feed-forward control of the stands of a multi-stand rolling mill train by rolling force measurement in the first roll stand of the rolling mill train cannot, by its very principle, be used for a single-stand train.

Both known techniques have a further disadvantage in that they cannot utilize selective roll cooling in order to adapt the roll crown. Selective adaptation of the roll crown is useful in particular if the other actuating elements for influencing the roll gap shape (e.g. roll reverse bending and roll displacement) are at their limits of adjustment, e.g. in the case of increased rolling force due to a localized temperature drop.

This problem is particularly prevalent in continuous casting and rolling plants where there is no more than limited compensation for temperature variations in the strip, so that temperature profiles (over the length and/or the strip width) have not evened out before the strip reaches the mill stand or stands. Temperature variations can also occur in hot-rolled wide strip trains, e.g. due to the so-called skidmarks or uneven through-heating of the cast slab in the furnace.

DE 101 56 008 A1 and, with identical content, US 2004/205 951 A1 disclose a control method for a rolling mill train,
wherein a strip section temperature is determined in each case for strip sections upstream of the first roll stand,
wherein the strip section temperatures for the time of rolling of the respective strip section in the first roll stand are included in the calculation in real time by a strip model.

In DE 101 56 008 A1, the temperature behavior and possibly also the phase transformation of the strip sections are determined purely with the aim of suitably adjusting strip heating and/or strip cooling. DE 101 56 008 A1 makes no provision for using the determined temperature in connection with the rolling process as such.

WO 2008/043 684 A1 discloses a control method for a rolling mill train,
wherein a strip section temperature is determined in each case for strip sections upstream of a first roll stand of the rolling train,
wherein the strip section temperatures for the time of rolling of the respective strip section in the first roll stand are predicted using a strip model on the basis of the temperatures determined,
wherein, using the predicted temperatures of the strip sections, at least one respective control parameter for rolling of the strip sections in the first roll stand is determined,
wherein an adjusting device acting on the first roll stand is controlled during rolling of the respective strip section taking the respective control parameter determined into account.

EP 2 301 685 A1 discloses a control method for a rolling mill train, wherein in respect of sections of a strip, a respective temperature of the strip sections is determined ahead of a first roll stand of the rolling train. Based on a strip model and with reference to the temperatures that have been determined, the temperatures of the strip sections are predicted using a prediction horizon that corresponds to a plurality of strip sections.

SUMMARY

The temperature characteristic of the strip can be taken into consideration in a particularly advantageous manner when rolling the strip. In particular, the temperature characteristic of the strip can be taken into consideration when adjusting the profile of the roll gap.

Accordingly, a control method for a rolling mill train, includes:
the temperatures of the strip sections are predicted using a first prediction horizon, by the strip model, for the instant of the rolling of the respective strip section in the first roll stand, the first prediction horizon corresponds to a plurality of strip sections that are to be rolled in the first roll stand, for the first prediction horizon, a manipulated variable characteristic is set for the adjusting device, a profile of a roll gap formed by work rolls of the first roll stand is influenced using the manipulated variable characteristic, using a roll stand model, a respective roll gap profile is predicted for the first roll stand using the predicted temperatures of the strip sections and the manipulated variable characteristic set for the strip sections corresponding to the first prediction horizon, the profile being formed by the work rolls of the first roll stand at the time of rolling of the respective strip section, the manipulated variable characteristic set is optimized on the basis of the roll gap profile predicted for the strip sections and of a respective setpoint profile, and the current value of the optimized manipulated variable characteristic corresponds to the control parameter and is pre-set as the manipulated variable for the adjusting device.

The aforementioned approach can be further improved as follows:

feeding at least the predicted temperatures into a rolling force model, predicting the rolling force required for rolling the respective strip section in the first roll stand by the rolling force model using the predicted temperatures for the strip sections corresponding to the first prediction horizon, and predicting the roll gap profiles by the roll stand model using the predicted rolling forces.

The adjusting device for influencing the roll gap profile can be implemented as required. In particular, roll bending and/or roll shifting are possible options. The adjusting device may include a roll cooling device. The roll cooling device can be controllable in a spatially resolved manner in particular in the strip width direction.

It is possible for the control method also to be implemented with a second prediction horizon for a second roll stand downstream of the first roll stand of the rolling mill train. In this case the strip sections are rolled in the first roll stand from a first entry thickness to a first exit thickness and, in the second roll stand, from a second entry thickness to a second exit thickness.

It is possible for the first exit thickness and/or the second entry thickness to be determined for specific strip sections. In particular, this procedure allows load redistribution between the first and the second roll stand in ongoing rolling operation.

Although the prediction horizon for the second roll stand can be determined as required, it must however—similarly to the prediction horizon for the first roll stand—be dimensioned so as to correspond to a plurality of strip sections, i.e. so that a plurality of strip sections are rolled in the second roll stand during the prediction horizon for the second roll stand. The second prediction horizon may be dimensioned such that, during the second prediction horizon, a plurality of strip sections are rolled both in the first and in the second roll stand. In particular the prediction horizons for the first and the second roll stand are dimensioned such that the difference between the prediction horizons corresponds to the time required by a strip section to travel from the first roll stand to the second roll stand. The prediction horizons can be based, so to speak, on the same point upstream of the first roll stand.

In many cases, the malleability of the strip can also vary over the width of the strip, e.g. due to temperature and/or hardening differences. In such cases, provision may be made as follows:

a respective current operator-side material modulus and a respective current drive-side material modulus are predicted for the strip sections, using the predicted temperatures for the instant of the rolling of the respective strip section in the first roll stand, a roll gap of the first roll stand can be influenced on the operator side and drive side by the actuating device, and the material moduli correspond to the control parameters and are used to parameterize a roll gap control unit on the operator side and on the drive side at the instant when the respective strip section is rolled in the first roll stand.

The inventive approaches can therefore be further improved as follows:

the strip model includes a material model by which an expected material property other than the temperature for the strip sections to be rolled in the first roll stand is predicted in each case for the instant of the rolling of the respective strip section in the first roll stand, and the predicted material properties are taken into consideration when determining the at least one control parameter.

In many cases it may suffice to predict the temperatures for the strip sections as scalar variables. It is often advantageous, however, if the strip section temperatures predicted by the strip model are spatially resolved in the strip width direction. In this case, the temperatures determined for the strip sections may already be spatially resolved in the strip width direction.

Models for basic materials industry plants are usually prone to error because of the complexity of the operations to be modeled, and also because only limited data acquisition is possible. In order to correct such errors in real time:

the strip model and/or another model used in the context of determining the at least one control parameter can be parameterized by a model parameter, in addition to variables determined in the context of determining the at least one control parameter using the parameterizable model, real-time functional dependences of the determined variables on the model parameter are determined, an expected value for a measured value and a functional dependence of the expected value on the model parameter are determined for the strip sections in real time using the variables determined by the parameterizable model, a corresponding measured value is acquired for the strip sections in real time by a measuring device disposed upstream, on or downstream of the first roll stand, the model parameter is re-determined on the basis of the measured value, the expected value and the functional dependence of the expected value on the model parameter, the parameterizable model is re-parameterized on the basis of the re-determined model parameter, and the variables already determined for the strip sections in the context of determining the at least one control parameter using the parameterizable model are corrected in real time.

This ensures in particular that the error-prone model can be adapted during ongoing operation, i.e. during rolling of the strip sections.

Processing of the machine code by the control computer causes the control computer to carry out a control method.

BRIEF DESCRIPTION OF THE DRAWINGS

Further advantages and details will emerge from the following description of exemplary embodiments in conjunction with the accompanying schematic drawings in which.

DETAILED DESCRIPTION OF THE PREFERRED EMBODIMENT

Figure 1:
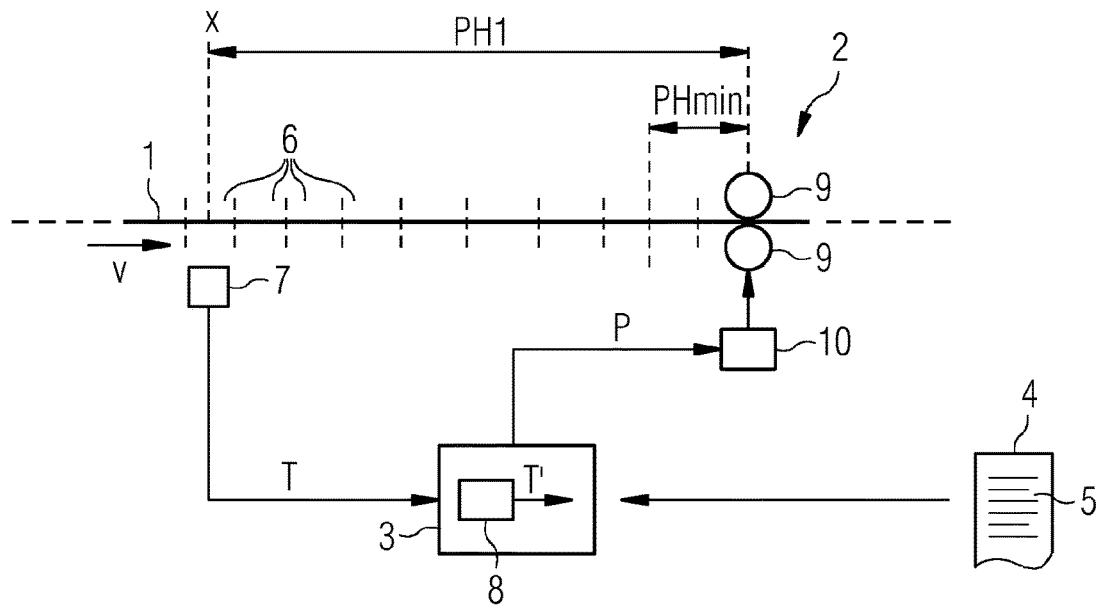
FIG. 1 shows a rolling mill train.

Reference will now be made in detail to the preferred embodiments, examples of which are illustrated in the accompanying drawings, wherein like reference numerals refer to like elements throughout.

As shown in FIG. 1, a rolling mill train for rolling a strip 1 has a first roll stand 2. The first roll stand 2 can be the only stand of the rolling mill train. Alternatively, further stands may be present. The strip 1 is generally a metal strip, e.g. a steel, aluminum, magnesium or copper strip. Other metals and metal alloys are also possible.

The rolling mill train and therefore also the first roll stand 2 are controlled by a control computer 3. The control computer 3 is programmed with a computer program 4. The computer program 4 is formed of machine code 5 which can be processed directly by the control computer 3. Processing of the machine code 5 by the control computer 3—i.e. operation of the control computer 3—causes the control computer 3 to carry out at least one—or possibly a plurality—of the control methods which will be explained in greater detail in connection with FIGS. 2 to 19.

Figure 2:
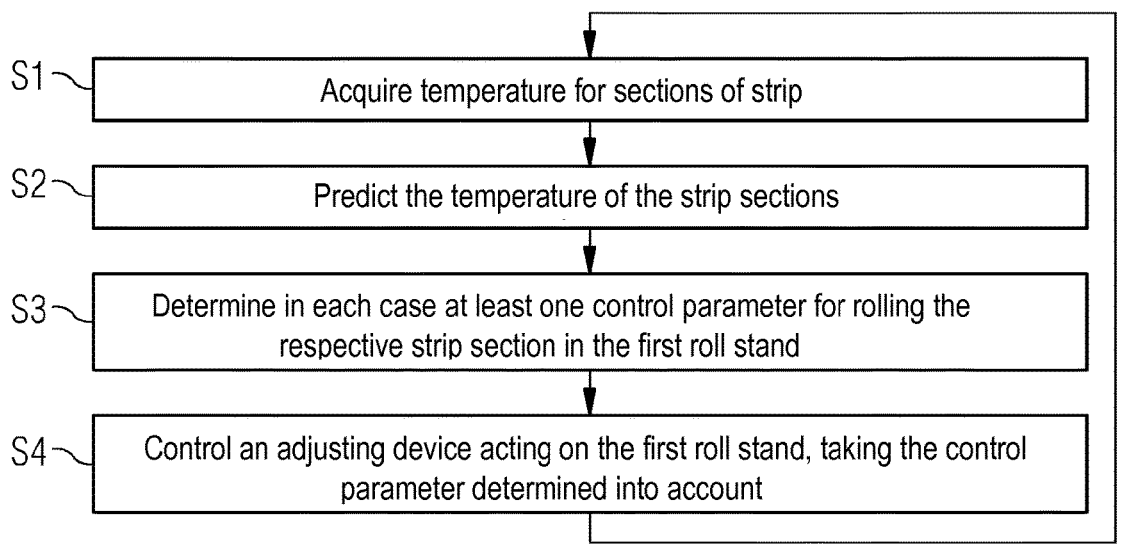
FIGS. 2 and 3 show flow charts.

As shown in FIG. 2, in S1 the control computer 3 receives a respective temperature T for strip sections 6 of the strip 1. It is possible (and even usual) for the temperatures T of the strip sections 6 as shown in FIG. 1 to be metrologically acquired using a temperature measuring device 7. Alternatively, they can be determined in other ways—in particular by calculation.

However, irrespective of how the temperatures T of the strip sections 6 are determined, in S1 they are determined for a location x upstream of a first roll stand 2. The temperature T is therefore representative of the respective temperature T of the respective strip section 6 at a point in time when the strip section 6 is still upstream of the first roll stand 2.

On the basis of the programming with the computer program 4, the control computer 3 implements among other things a strip model 8. The strip model 8 uses mathematical physics equations to model at least the temperature behavior of the strip 1. In particular, a thermal conduction equation is solved by the strip model 8 for the strip sections 6. For the purposes of solving the thermal conduction equation, in particular the internal thermal conduction within the strip 1 and the interaction of the strip 1 with its environment are taken into account, e.g. the interaction with cooling and heating devices, a scale breaker, contact with transport rollers, contact with work rolls 9 of the first roll stand 2, etc. In addition, a phase transition equation coupled with the thermal conduction equation can also be solved if necessary. The corresponding procedures are well known to persons skilled in the art. An advantageous thermal conduction equation is described, for example, in DE 101 29 565 A1 or, with identical content, U.S. Pat. No. 6,860,950 B2. An advantageous phase transition equation is described, for example, in EP 1 711 868 B1 or, with identical content, U.S. Pat. No. 7,865,341 B2. The strip model 8 can also possibly include further models.

Using the strip model 8, in S2 the control computer 3 therefore predicts, on the basis of the determined temperatures T, the temperature of the strip sections 6 for the time of rolling of the respective strip section 6 in the first roll stand 2. The predicted temperature is denoted by the reference character T' to differentiate it from the determined temperature T.

The prediction is made using a prediction horizon PH1, hereinafter referred to as the first prediction horizon PH1. The first prediction horizon PH1 corresponds to the number of time increments over which the strip model 8 predicts the temperature T', a strip section 6 being rolled in the first roll stand 2 during each time increment.

At minimum, the first prediction horizon PH1 includes a single time increment. A minimum prediction horizon PHmin is therefore determined by the prediction of the temperature of the strip sections 6 being a single time increment ahead. In this case a single strip section 6 is therefore rolled in the first roll stand 2 during the first prediction horizon PH1, namely the immediately preceding strip section 6. However, in many embodiments—and this will be explained in greater detail below—the first prediction horizon PH1 is designed such that during the first prediction horizon PH1 a plurality of strip sections 6 are rolled in the first roll stand 2, e.g. five, eight, ten or even more strip sections 6.

In a S3, the control computer 3 uses the predicted temperatures T' of the strip sections 6 to determine at least one control parameter P for the rolling of the respective strip section 6 in the first roll stand 2. In S4, the control computer 3 controls an adjusting device 10. The adjusting device 10 acts on the first roll stand 2. The adjusting device 10 is controlled during rolling of the respective strip section 6 taking into account the control parameter P determined for the strip section 6 currently to be rolled.

The FIG. 2 procedure will now be explained again using an example.

It is assumed that a particular temperature T is determined, e.g. acquired using measuring instruments, at a particular point in time for a particular strip section 6 (S1). The corresponding strip section 6 is tracked as it passes through the rolling mill train. The temperature T' expected for the corresponding strip section 6 is continuously taken into account (S2), the model-supported temperature prediction being at least one time increment ahead of the location of the corresponding strip section 6. At the point in time when the strip section 6 in question is directly upstream of the first roll stand 2, i.e. the immediately preceding strip section 6 is being rolled in the first roll stand 2, the control parameter P is determined for the strip section 6. The control parameter P is therefore known early enough to the control computer 3 to enable the control computer 3 to take the control parameter P into account for controlling the adjusting device 10 when the strip section 6 in question is rolled in the first roll stand 2. Alternatively, the determination of the control parameter P includes the predicted temperature T' of the strip section 6 immediately upstream of the first roll stand 2 or—if the first prediction horizon PH1 is greater than the minimum prediction horizon PHmin—additionally the predicted temperatures T' of further strip sections 6.

The FIG. 2 procedure is generally carried out in a clocked manner, e.g. at between 0.1 and 0.5 second intervals, generally at approx. 0.2 to 0.3 second intervals. With each clock pulse, the temperature T is determined for a new strip section 6 and thus known to the control computer 3. The temperature is then predicted on the basis of a model.

For many embodiments, the control computer 3 also requires the predicted temperatures T' and possibly other characteristics of other strip sections 6 and/or predicted characteristics of the first roll stand 2. Insofar as strip sections 6 to be rolled after the strip section 6 in question are concerned, their temperatures and characteristics are known to the control computer 3 if they are within the first prediction horizon PH1. For example, in the case of a first prediction horizon PH1 of eight strip sections 6, at the time when the temperature T is determined for a particular strip section 6, the expected temperatures T' of the seven subsequent strip sections 6 are already known to the control computer 3 on the basis of the prediction already carried out previously. In other words, in the case of a first prediction horizon PH1 of eight strip sections 6, the predicted temperatures T' of the eight strip sections 6 upstream of the first roll stand 2 are known at each point in time. They can therefore be taken into account for determining the control parameter P for the next strip section 6 to be rolled in the first roll stand 2. Insofar as strip sections 6 to be rolled before the strip section 6 in question are concerned, their temperatures and characteristics are known to the control computer 3 from past history.

A possible embodiment of the control method will now be explained in greater detail in connection with FIG. 3, wherein the first prediction horizon PH1 is dimensioned such that a plurality of strip sections 6 are rolled in the first roll stand 2 during the first prediction horizon PH1. Purely by way of example it will be assumed in this context that the first prediction horizon PH1 corresponds to eight strip sections 6. However, this dimensioning is only for illustrative purposes and is not therefore to be understood as a mandatory limitation to eight strip sections 6.

Figure 3:
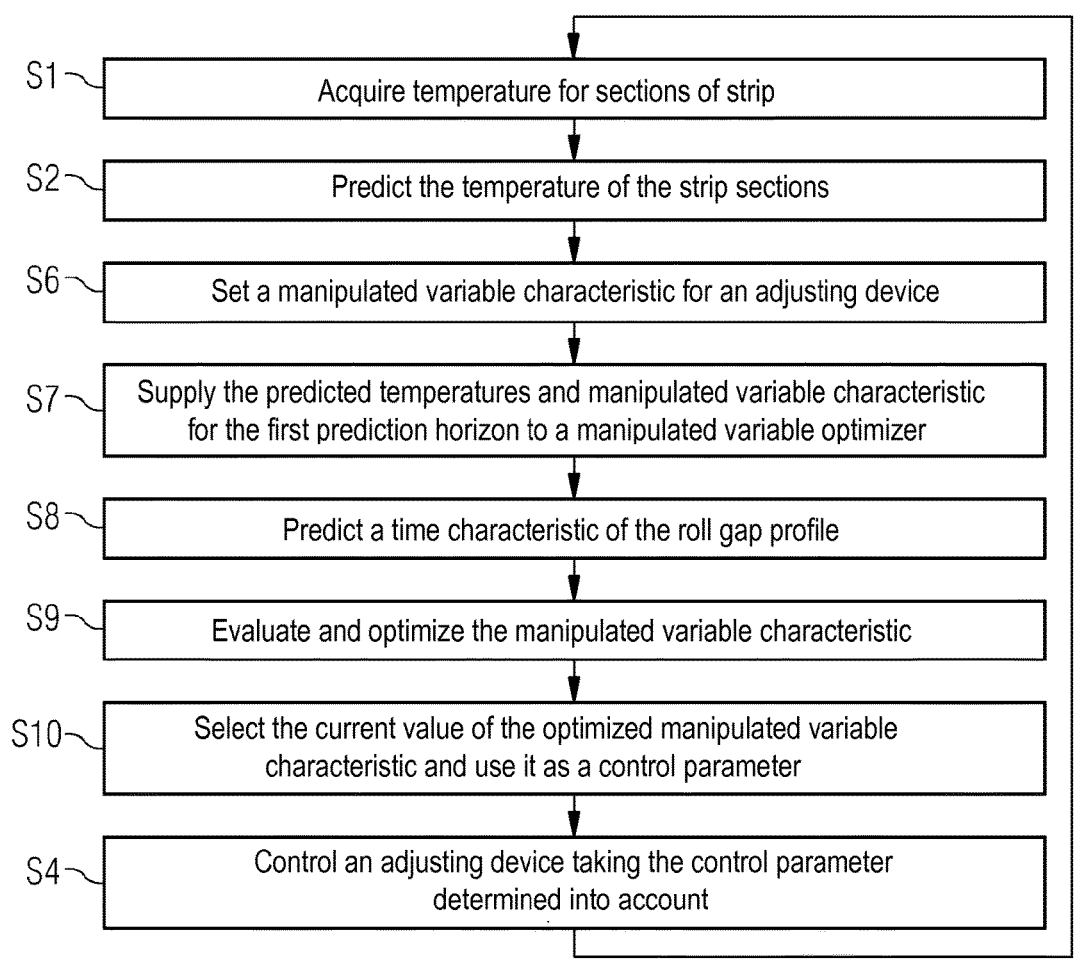

In FIG. 3, S1, S2 and S4 are present as is also the case in FIG. 2. S1 and S4 require no further explanation. With regard to S2 it must only be mentioned that, as part of S2 in FIG. 3, S2 is executed using the first prediction horizon PH1 of a plurality of strip sections 6—eight purely by way of example. During S2 in FIG. 3, the corresponding temperatures T' are therefore predicted for all the strip sections 6 located up to eight strip sections 6 upstream of the first roll stand 2 at the time in question.

Figure 4:
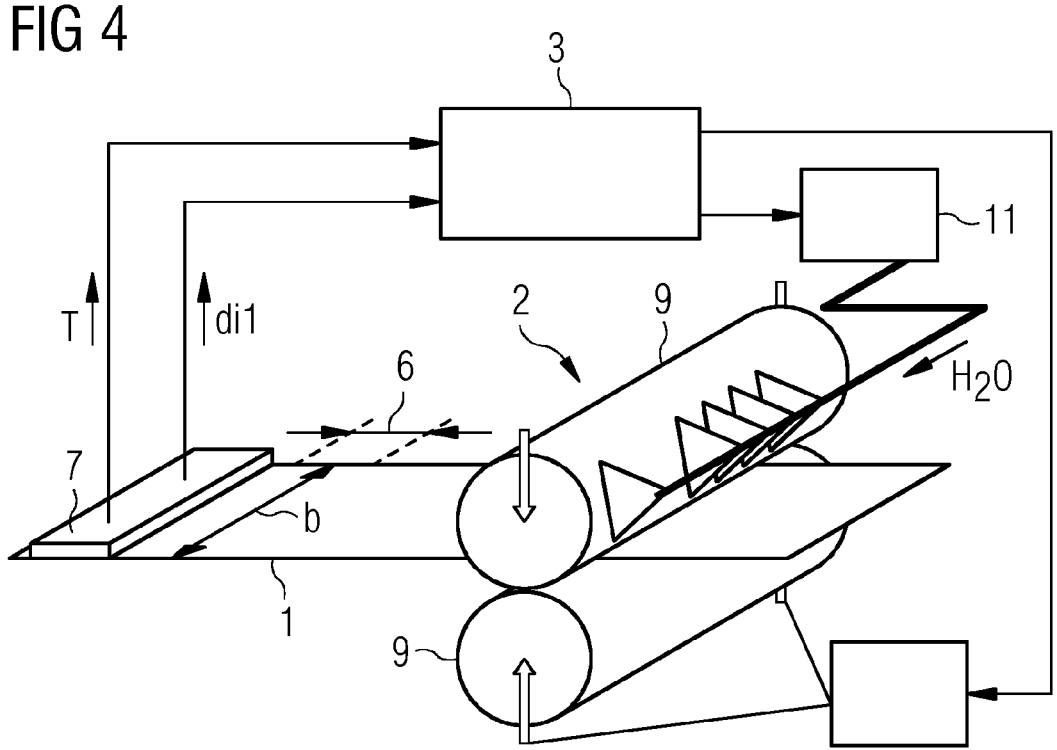
FIG. 4 shows a first roll stand.

S3 in FIG. 2 is implemented in FIG. 3 by S6 to S10. In particular, in the context of the embodiment in FIG. 3 it is assumed that the adjusting device 10 is designed such that it can be used to adjust the roll gap profile—i.e. the distance between the work rolls 9 of the first roll stand 2 as viewed across the width. For this purpose the adjusting device 10 can be implemented, for example, as a roll shifting device and/or as a roll bending device. As shown in FIG. 4, the adjusting device 10 can include—possibly solely, or alternatively in addition to a roll shifting and/or roll bending device—a roll cooling device 11. As illustrated in FIG. 4, the roll cooling device 11 can be controllable in a spatially resolved manner in particular in the strip width direction.

In S6, in accordance with FIG. 3, a manipulated variable characteristic S(t) is set for the adjusting device 10, i.e. the time characteristic of the manipulated variable S is set. The manipulated variable characteristic S(t) is set for the first prediction horizon PH1—i.e. the strip section 6 in question and the seven strip sections 6 following the strip section 6 in question. The roll gap profile is influenced—according to the nature of the adjusting device 10—by the manipulated variable characteristic S(t). In particular, the thermal camber of the work rolls 9, for example, can be adjusted by the roll cooling device 11.

Figure 5:
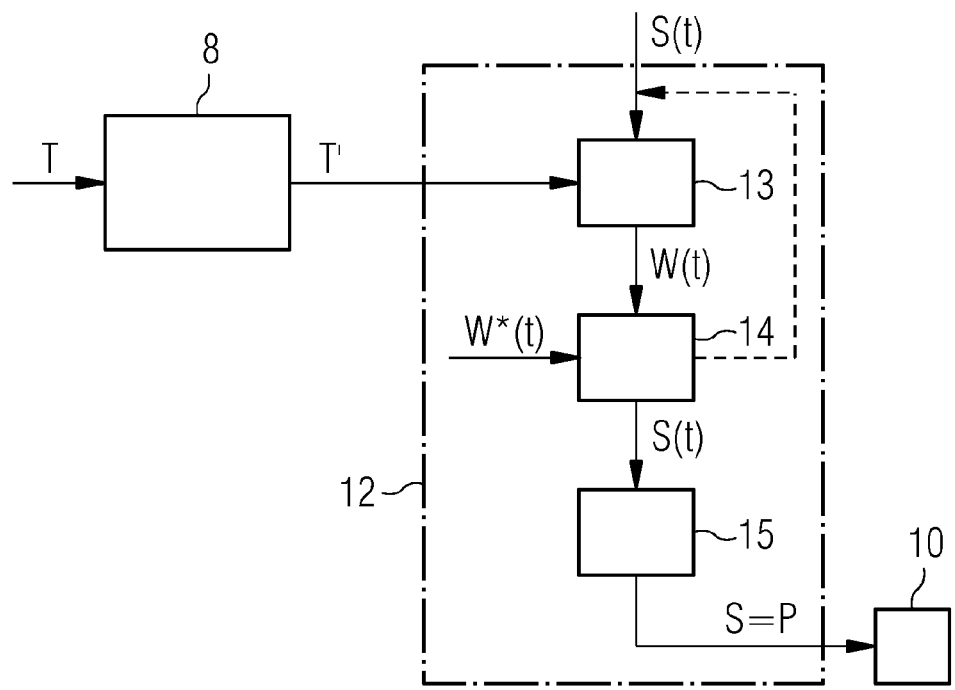
FIG. 5 shows a block diagram.

In S7
the predicted temperatures T' of the strip sections 6 in the first prediction horizon PH1 at the time of rolling of the respective strip section 6 in the first roll stand 2, and
the manipulated variable characteristic S(t) for the first prediction horizon PH1 are fed to a manipulated variable optimizer 12—see FIG. 5.

The manipulated variable optimizer 12 is a software block implemented by the control computer 3. It includes, among other things, a roll stand model 13. The roll stand model 13 models in particular the thermal camber of the work rolls 9 and the wear of the work rolls 9 resulting from contact of the work rolls 9 with the strip 1. The roll stand model 13 additionally models the effect of the manipulated variable characteristic S(t) on the roll gap, in particular the effect of the roll cooling device 11 on the thermal camber.

The roll stand model 13 predicts a roll gap profile characteristic W(t) over time as an output variable in S8. In S8, the roll stand model 13 therefore predicts the resulting roll gap profile W for the respective strip section 6 for each strip section 6 within the first prediction horizon PH1. The roll stand model 13 determines the roll gap profile characteristic W(t) using the manipulated variable characteristic S(t) fed into it and the predicted temperatures T' of the strip sections 6.

As shown in FIGS. 3 and 5, the roll gap profile characteristic W(t) is evaluated in an evaluator 14 and optimized by the evaluator 14 in S9. If optimization so requires, the roll stand model 13 can if necessary be re-invoked following modification of the set manipulated variable characteristic S(t). This is indicated by the dashed line in FIG. 5.

To optimize the manipulated variable characteristic S(t), the roll gap profile characteristic W(t) determined is compared with a setpoint profile characteristic W*(t). The setpoint profile characteristic W*(t) can be constant. Irrespective of whether or not the setpoint profile characteristic W*(t) is constant, the primary objective of optimization is to ensure flatness of the strip 1. A maximally uniform profile should be rolled where possible as a matter of secondary importance.

Temperature measurement as shown in FIG. 4 may be linked to strip thickness measurement and/or strip profile measurement. In this case the setpoint profile W* for the respective strip section 6 can be determined in a profile and flatness model on the basis of the measured strip thickness and measured strip thickness profile respectively.

The optimized manipulated variable characteristic S(t) is fed to a selector 15 as shown in FIG. 5. In S10, the selector 15 selects the current value of the optimized manipulated variable characteristic S(t), i.e. the value of the optimized manipulated variable characteristic S(t) that was determined for the next strip section 6 to be rolled. This value S corresponds to the control parameter P of S4 and is specified as the manipulated variable for the adjusting device 10 in S4 of FIG. 3.

It is possible for the manipulated variable optimizer 12 to "forget" the optimized manipulated variable characteristic S(t) determined in the course of FIG. 3. However, the manipulated variable optimizer 12 typically "notes" the optimized manipulated variable characteristic S(t) and uses it in the next cycle, i.e. when the next strip section 6 is being handled, as the set manipulated variable characteristic S(t) for the coinciding strip sections 6.

The procedure explained above in connection with FIGS. 3 to 5 can be further improved by an embodiment of the kind explained below in connection with FIGS. 6 and 7.

Figure 6:
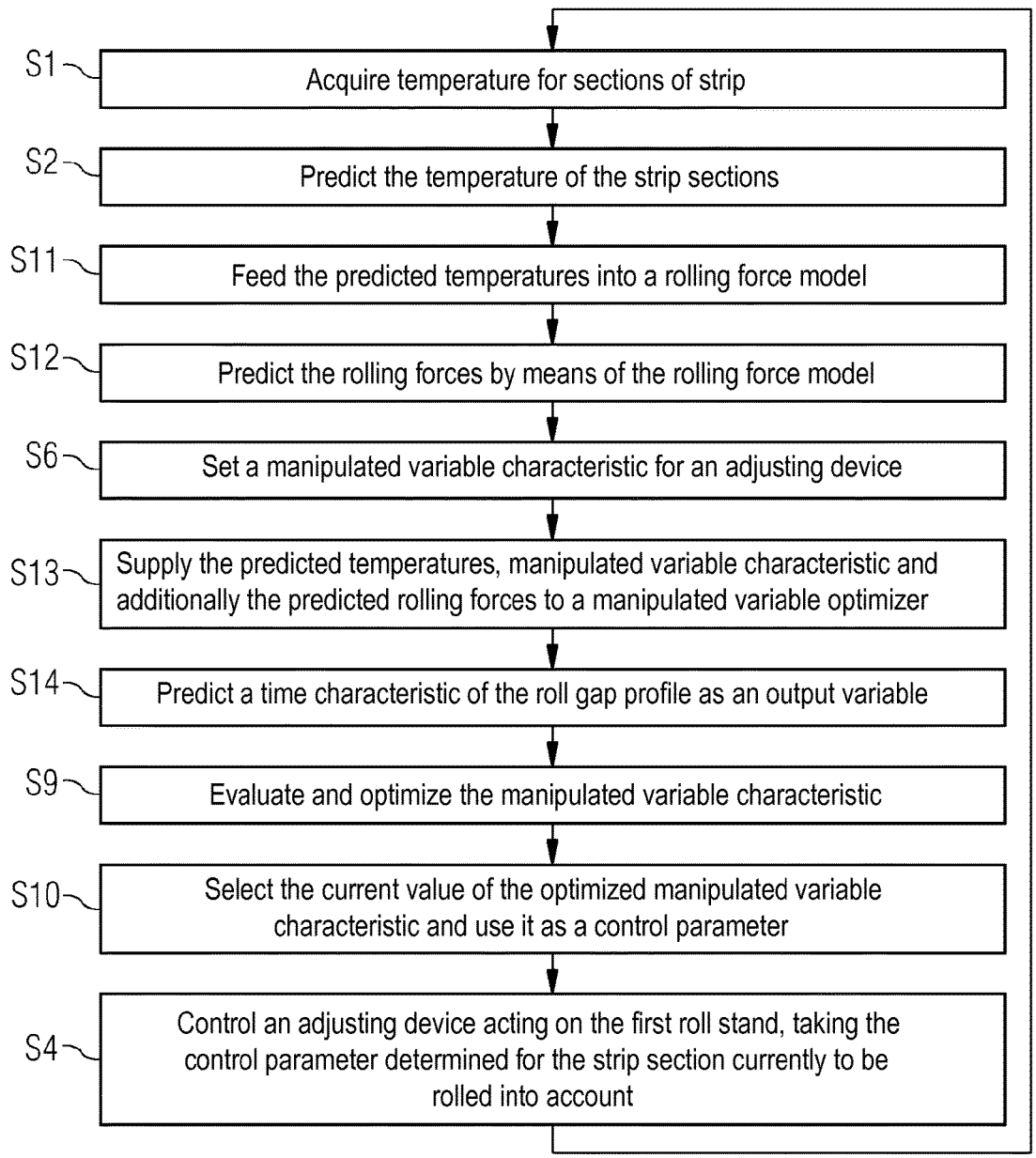
FIG. 6 shows a flow chart.
Figure 7:
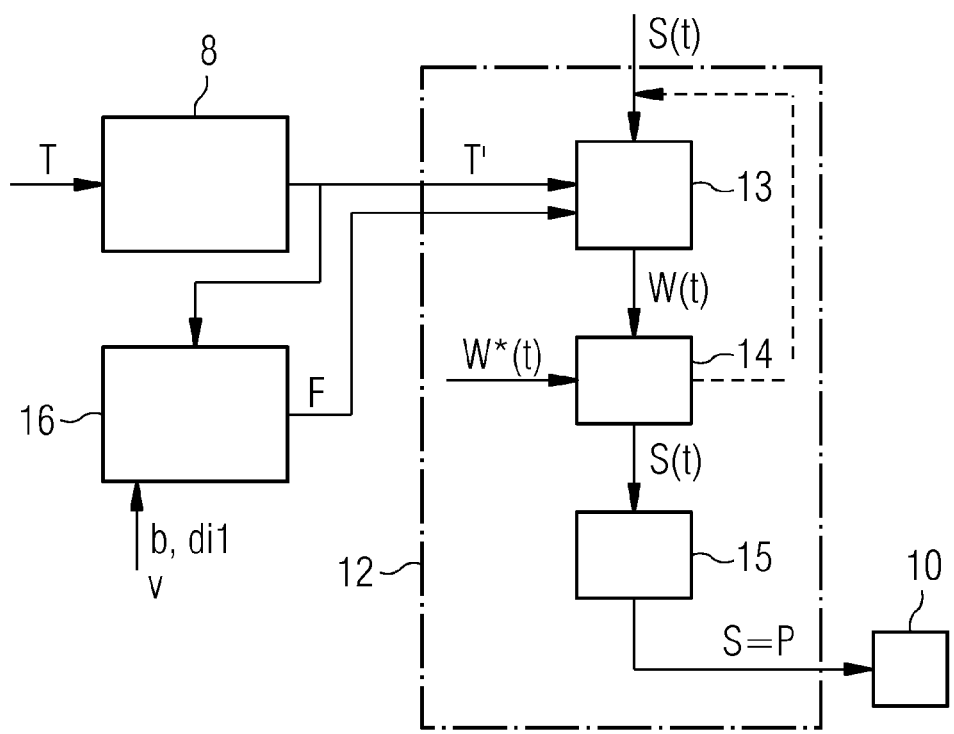
FIG. 7 shows a block diagram.

FIG. 6 is a modification of FIG. 3, FIG. 7 a modification of FIG. 5. Only the differences between the respective FIGS will therefore be examined in greater detail below.

FIG. 6 differs from FIG. 3 in that it includes S11 and S12. In S11, the temperatures T' predicted by the strip model 8 are fed into a rolling force model 16. In S12, rolling forces F are predicted for the strip sections 6 in question by the rolling force model 16 using the predicted temperatures T'. The rolling force model 16 therefore determines, for each strip section 6 to be rolled within the first prediction horizon PH1, what rolling force F is required in order to roll the corresponding strip section 6 from a first entry thickness di1 to a desired first exit thickness do1. The other variables required for this purpose, such as the chemical composition of the strip 1, the first entry thickness di1, the strip width b, the rolling velocity v, entry- and exit-side tensions, etc., are likewise fed into the rolling force model 16.

According to FIG. 6, S7 and S8 in FIG. 3 are additionally replaced by S13 and S14. In S13, the predicted temperatures T' and the set manipulated variable characteristic S(t) are fed to the manipulated variable optimizer 12—as is also the case in S7 of FIG. 3. Also fed to the manipulated variable optimizer 12 in S13 are the predicted rolling forces F. In S14, the manipulated variable optimizer 12 predicts, as part of its roll stand model 13, similarly to S8 in FIG. 3, the respective roll gap profile W for the strip sections 6 to be rolled in the first roll stand 2 in the first prediction horizon PH1. However, in S14 the predicted rolling forces F are additionally taken into account for predicting the roll gap profile characteristic W(t).

Figure 8:
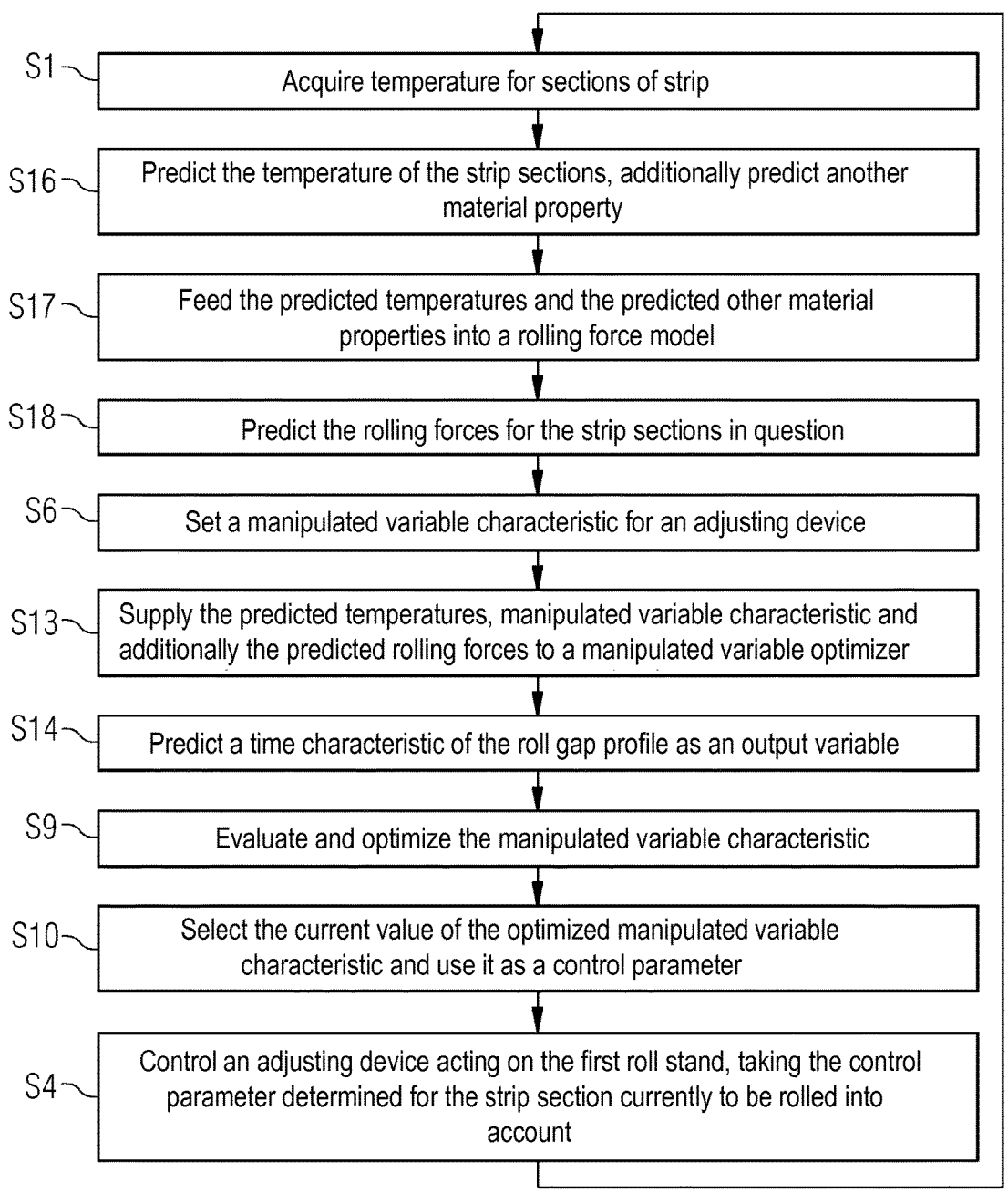
FIG. 8 shows a flow chart.
Figure 9:
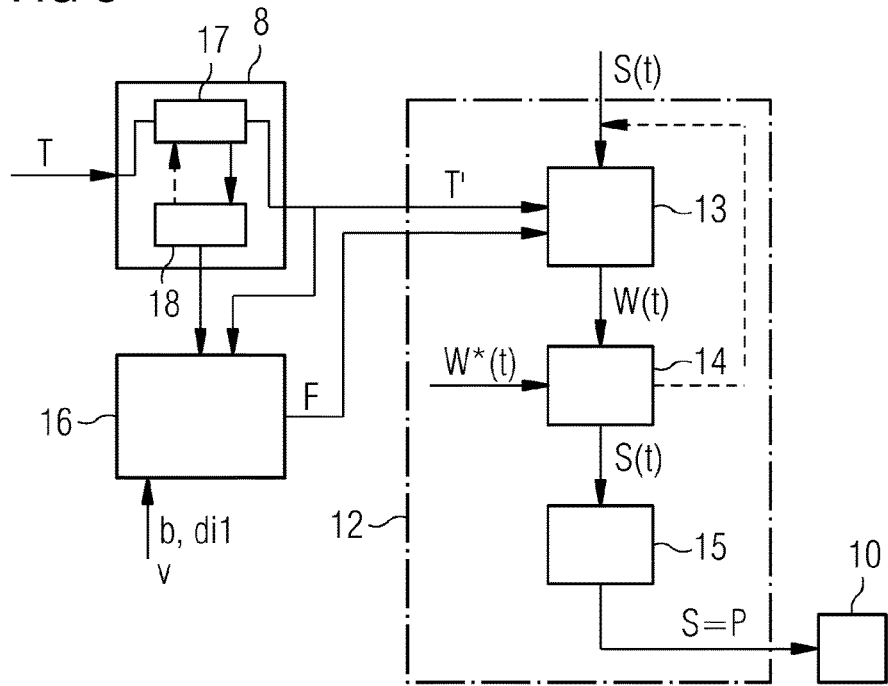
FIG. 9 shows a block diagram.

The procedure in FIGS. 6 and 7 can be improved still further by the procedure in FIGS. 8 and 9.

According to FIG. 8, S2, S11 and S12 of FIG. 6 are replaced by S16 to S18. The strip model 8 as shown in FIG. 9 additionally has a temperature model 17 and a material model 18. In S16, the temperatures T' of the strip sections 6 are predicted by the temperature model 17—as previously in S2 by the strip model 8. A further material property which is expected for the respective strip sections 6 to be rolled in the first roll stand 2 in the first prediction horizon PH1 is additionally predicted by the material model 18 in S16 during rolling of the respective strip section 6 in the first roll stand 2. The further material property is—self-evidently— different from the temperature T', but affects the rolling force F required for rolling the respective strip section 6. For example, the further material property can be a degree of phase change, a material hardening, a recrystallization or a grain structure.

If necessary, there can be uni- or bidirectional coupling between the temperature changes and the changes in the other material property. In the former case, the temperature characteristic of the strip section 6 considered is first determined by the temperature model 17 during the first prediction horizon PH1. The determined temperature characteristic over time is then pre-set for the material model 18, and finally the further material property is determined on the basis of the material model 18. In the latter case, the predicted temperature T' and the predicted further material property of the respective strip section 6 in question are determined in a stepwise coupled manner.

In S17, the corresponding other material properties for the corresponding strip sections 6 are also fed into the rolling force model 16—in addition to the values and variables mentioned in S11. In S18, the rolling force model 16 predicts the required rolling forces F, in addition also taking the other material properties into account.

As the other material properties affect the predicted rolling forces F, these in turn affecting the roll gap profile W and this in turn affecting the optimized manipulated variable characteristic S(t), in the procedure in FIGS. 8 and 9 the control computer 3 consequently also takes into account the predicted other material properties in determining the manipulated variable S currently to be output to the adjusting device 10, i.e. the corresponding control parameter P.

The determination of a manipulated variable S by which the profile of the roll gap formed by the work rolls 9 is influenced was explained above as an example of determining a control parameter P. In the following, an embodiment of the control method will be explained in connection with FIGS. 10 and 11. This embodiment can be implemented discretely. This embodiment can be realized in addition to the embodiments in FIGS. 3 to 9 if applicable.

Figure 10:
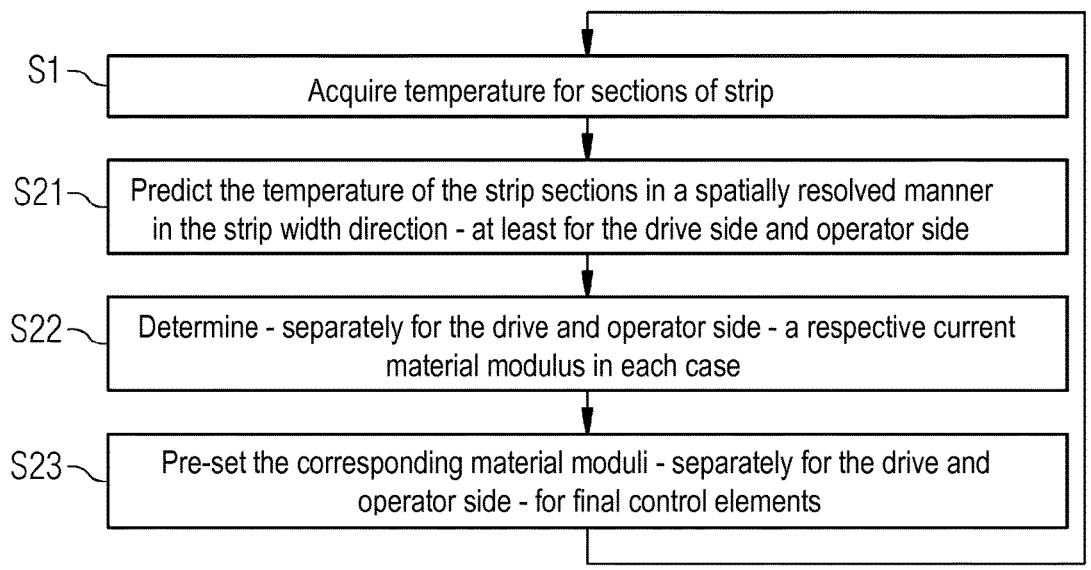
FIG. 10 shows a flow chart.

FIG. 10 is a possible embodiment of FIG. 2, but with S2 to S4 of FIG. 4 being replaced by S21 to S23.

In S21—similarly to S2—the temperature T' of the corresponding strip section 6 is predicted. However, unlike S2 of FIG. 2, the predicted temperature T' in the procedure as shown in FIG. 10 is spatially resolved in the strip width direction. The spatial resolution is such that a separate temperature T' is predicted at least for the drive side (DS) and the operator side (OS).

In the FIG. 10 embodiment, the first prediction horizon PH1 can be small. It can even correspond to the minimum prediction horizon PHmin. Alternatively, the first prediction horizon PH1 can be larger.

In S22, a respective current material modulus M which is expected for the time when the corresponding strip section 6 is rolled in the first roll stand 2 is predicted in determination blocks 19—separately for the operator and drive side—using the temperatures T' predicted for the respective side of the first roll stand 2 for the respective strip section 6. The respective material modulus M is essentially representative of the strength or rather deformability of the corresponding strip section 6 on the corresponding side of the first roll stand 2.

The adjusting device 10—namely at least independently of one another within limits—a final control element 20 (e.g. a hydraulic cylinder unit) can be controlled, by which the rolling force F can be applied to the work rolls 9 on the drive and operator side, thereby influencing the roll gap. According to FIGS. 10 and 11, in S23 the corresponding material moduli M are pre-set for the final control elements 20 at the time when the corresponding strip section 6 is being rolled in the first roll stand 2. They are therefore used at the corresponding time for operator- and drive-side roll gap control parameterization.

Figure 11:
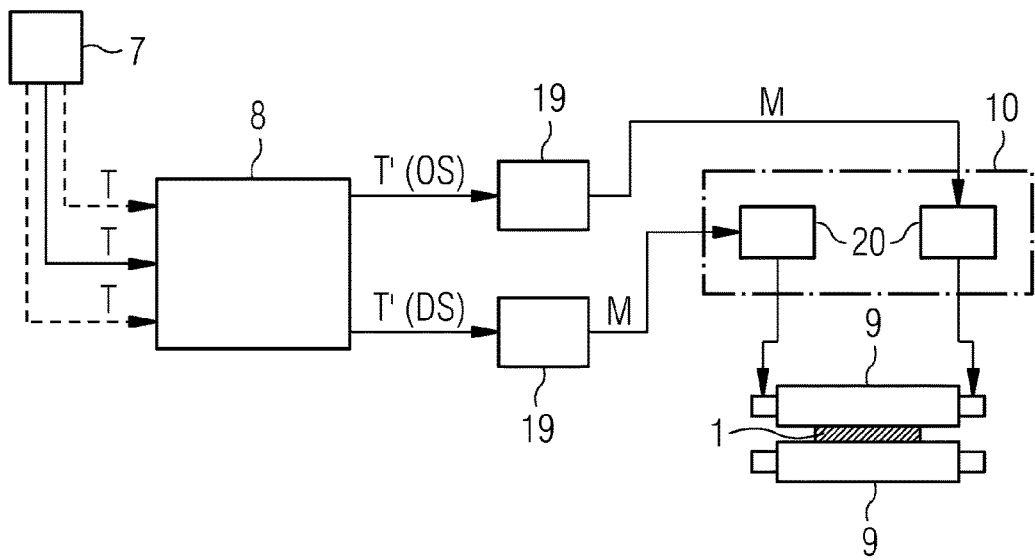
FIG. 11 shows a block diagram.
Figure 12:
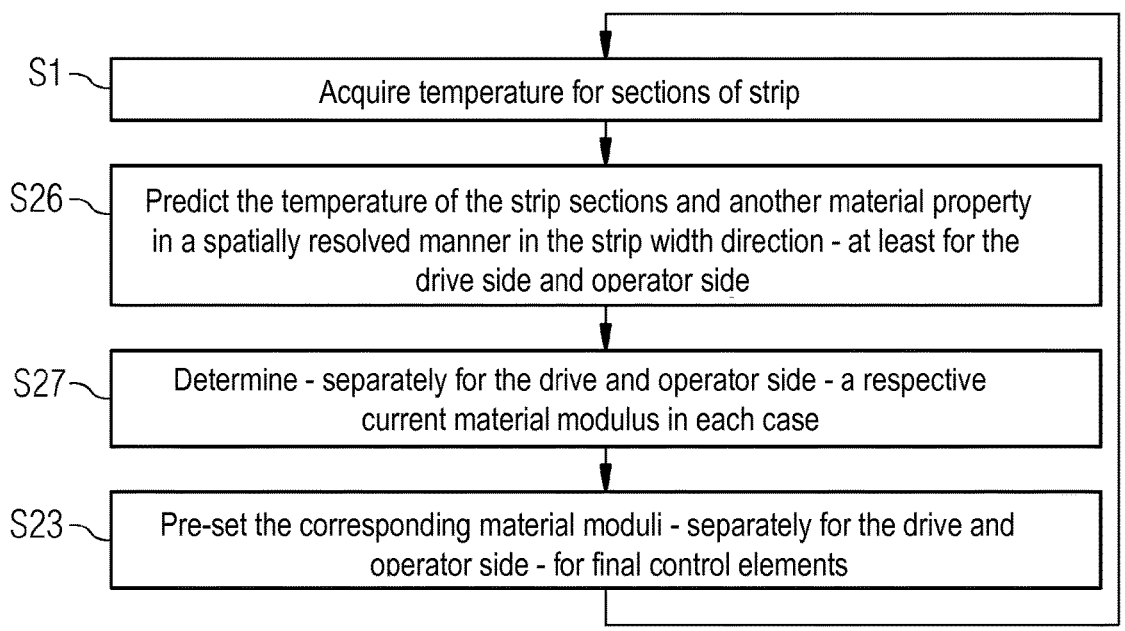
FIG. 12 shows a flow chart.
Figure 13:
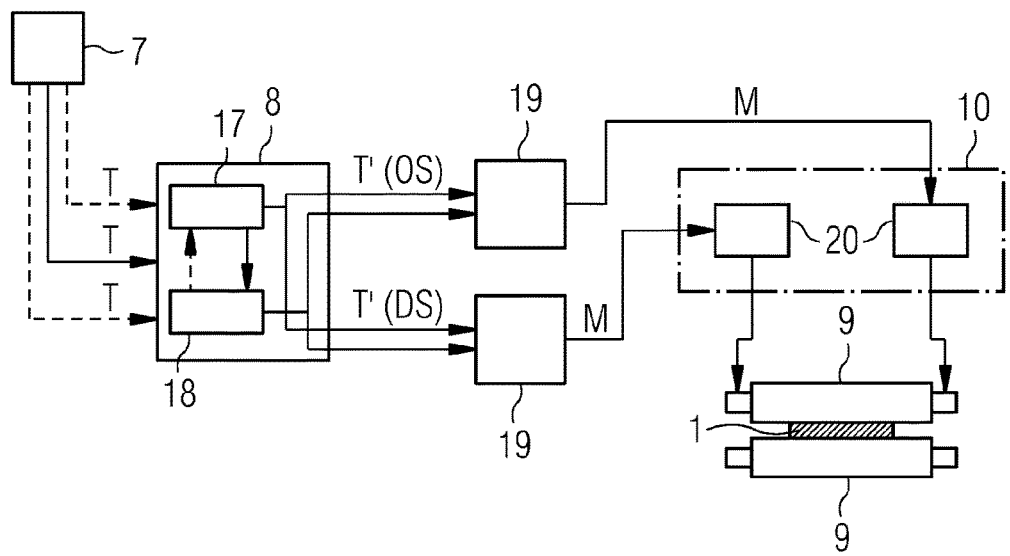
FIG. 13 shows a block diagram,
FIGS. 14 and 15 each show a strip section at different instants.
Figure 14:
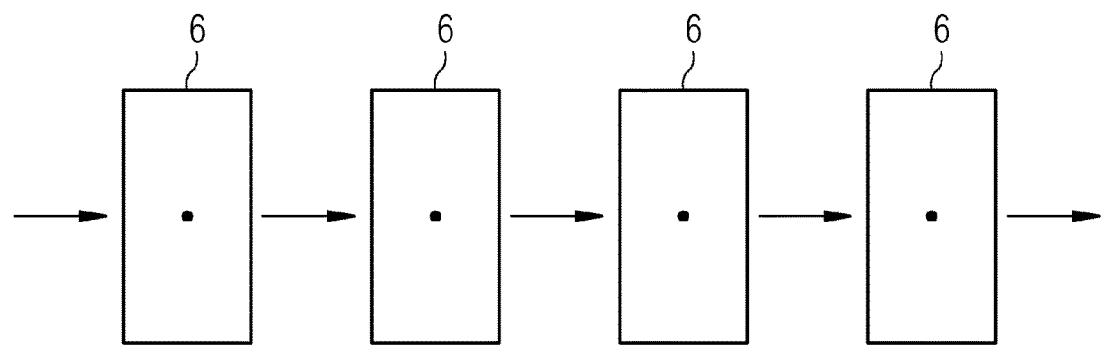

Similarly to the supplementing of FIGS. 6 and 7 with the embodiment in FIGS. 8 and 9, the embodiment in FIGS. 10 and 11 can be extended according to FIGS. 12 and 13. As shown in FIG. 12, S21 and S22 of FIG. 10 are replaced by S26 and S27. As shown in FIG. 13, the strip model 8 additionally includes the temperature model 17 and the material model 18.

In S26—similarly to S21 of FIG. 10—the operator-side and drive-side temperature T' of the corresponding strip section 6 is predicted by the temperature model 17. In S26,—similarly to S16 of FIG. 8—another material property of the corresponding strip section 6 at the time of rolling in the first roll stand 2 is predicted by the material model 18. However, as shown in FIG. 13, the other material property is additionally predicted separately for the drive side and the operator side of the first roll stand 2.

As shown in FIG. 13, the respective other material property is also fed to the determination blocks 19. The determination blocks 19 therefore determine the respective material modulus M not only using the respective predicted temperatures T' but also using the respective predicted other material properties.

In the context of the procedure in FIGS. 3 to 9, it can suffice to determine the temperatures T' predicted for the strip sections 6 as scalars, i.e. a single value for each strip section 6. This is indicated for one of the strip sections 6 in FIG. 14, which shows the location of the corresponding strip section 6 for different times, the temperatures T' for the respective time being indicated by a black circle in each case. If the temperature T' is predicted in a scalar manner, it self-evidently also suffices to carry out the (first-time) determination of the temperatures T' within the corresponding strip section 6 in a non-spatially-resolved manner in the strip width direction. However, in the case of the procedure of FIGS. 3 to 9, spatially resolved determination of the temperature T and prediction of the temperature T' is self-evidently also possible.

Figure 15:
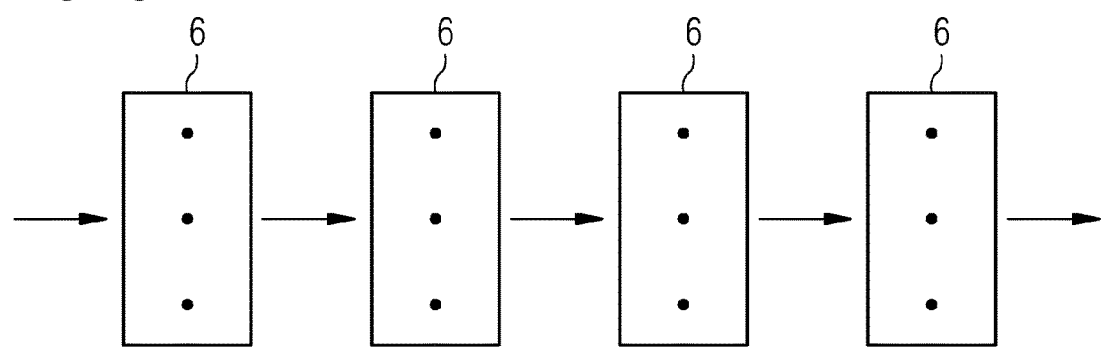

For the procedure of FIGS. 10 to 13, on the other hand, it is necessary for the temperatures T' (and possibly also other material properties) of the strip sections 6 predicted by the strip model 8 to be spatially resolved in the strip width direction. In general it is sufficient to predict the temperature T' for two points (i.e. left and right side of the strip) or—as shown in FIG. 15—for three points (left side, right side and center of the strip). However, more precise spatial resolution is alternatively possible.

It this case it can also possibly suffice to carry out the first-time determination of the temperature T—i.e. at the start of the first prediction horizon PH1—in a non-spatially-resolved manner in the strip width direction. This may be possible if, for example, the strip 1 initially has a uniform temperature T, but has a thickness wedge in the strip width direction and therefore cools more quickly on the thin side than on the thicker side. However, in general the first-time determination of the temperature T of the strip sections 6 is also carried out in this case in a spatially resolved manner in the strip width direction as indicated by the dashed line in FIGS. 11 and 13.

In many cases it suffices for a rolling mill train to have a single roll stand, i.e. only the first roll stand 2 is present. A single roll stand may be sufficient if the strip 1 is cast in a very near-net-shape manner, e.g. by rotating casting rolls. However, in many cases a plurality of roll stands are present. For example, a multi-stand production line generally has six or seven roll stands.

Figure 16:
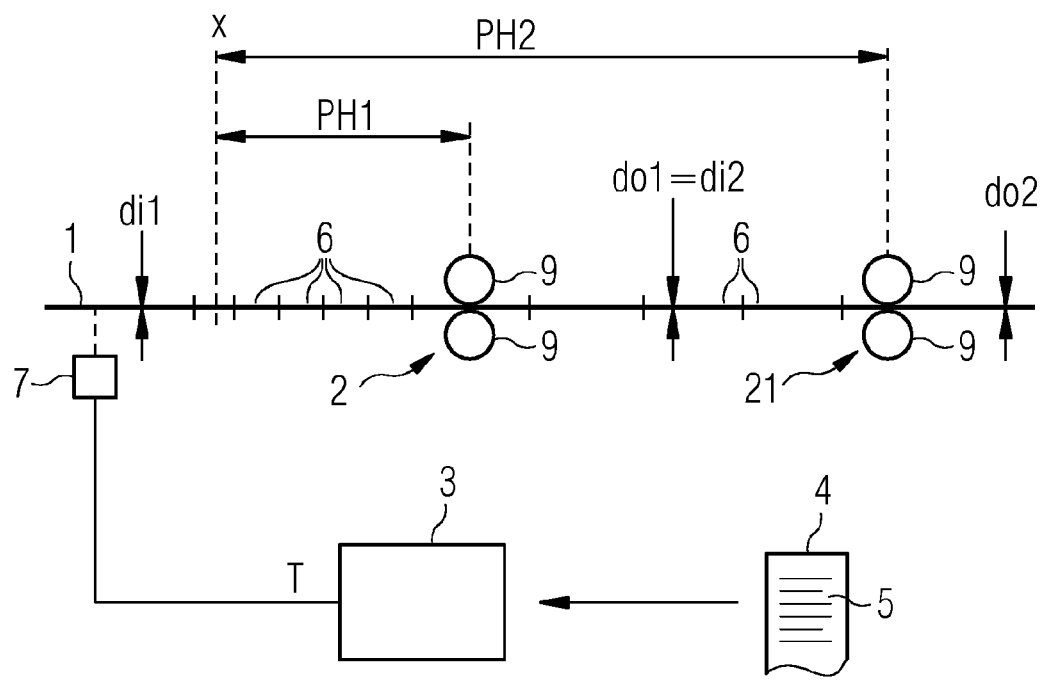
FIG. 16 shows a multi-stand rolling mill train.

If a plurality of stands are present, it is possible for the control method as shown in FIG. 16 also to be carried out for a second roll stand 21. This applies both to the procedure of FIGS. 3 to 9 and also to the procedure of FIGS. 10 to 13 as well as to combined procedures. As shown in FIG. 16, it can also be assumed without loss of generality that the second roll stand 21 is downstream of the first roll stand 2, so that the strip sections 6 are rolled first in the first roll stand 2 and then in the second roll stand 21. It can likewise be assumed without loss of generality that the strip 1 or rather the strip sections 6 are rolled from the first entry thickness di1 to the first exit thickness do1 in the first roll stand 2 and from a second entry thickness di2 to a second exit thickness do2 in the second roll stand 21.

As shown in FIG. 16, the second roll stand 21 is directly downstream of the first roll stand 2. In this case in which no other roll stand is disposed between the first and the second roll stand 2, 21, the second entry thickness di2 is identical to the first exit thickness do1. Otherwise the second entry thickness di2 is less than the first exit thickness do1.

Figure 17:
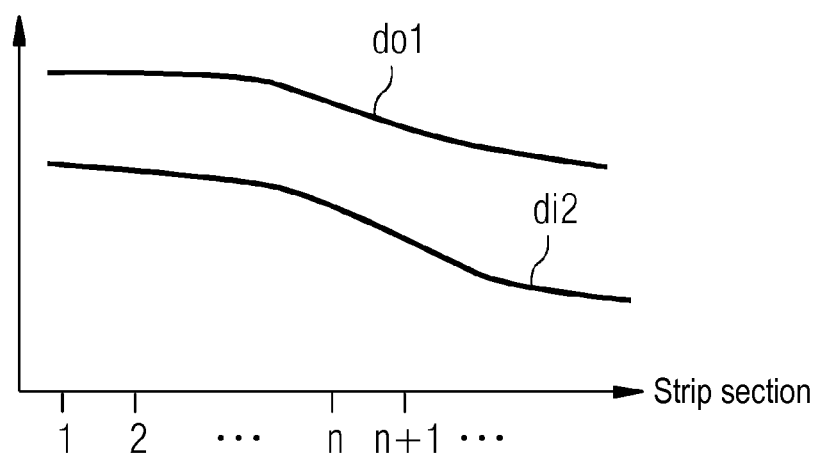
FIG. 17 shows an entry and an exit thickness characteristic.

It is possible for a pass schedule calculation to be performed in advance according to the usual known procedure for the (as shown in FIG. 16 multi-stage) rolling mill train. In this case the entry thicknesses di1, di2 and the exit thicknesses do1, do2 are determined on a one-off basis and then retained consistently—i.e. for all the strip sections 6 of the strip 1. Alternatively, it is possible to perform the pass schedule calculation dynamically for each strip section 6. In this case it is possible, as shown in FIG. 17, for the first exit thickness do1 and/or the second entry thickness di2 to be determined on a strip section specific basis. In particular, dynamic load distribution during ongoing operation of the rolling mill train is possible in this case.

It is possible to carry out the control method for the second roll stand 21 independently of the control method for the first roll stand 2. In this case a prediction horizon PH2 for the second roll stand 21—hereinafter referred to as the second prediction horizon PH2—can be determined independently of the first prediction horizon PH1. However, the second prediction horizon PH2 may be dimensioned such that a plurality of strip sections 6 are rolled both in the first and in the second roll stand 2, 21 during the second prediction horizon PH2. In particular, the second prediction horizon PH2, as shown in FIG. 16, can be greater by the time required by a strip section 6 to travel from the first roll stand 2 to the second roll stand 21. The first and the second prediction horizon PH1, PH2 in this case start at the same location x upstream of the first roll stand 2.

The previously described control method already yields very good results, but can be improved still further. This will now be explained with reference to FIGS. 18 and 19.

Figure 18:
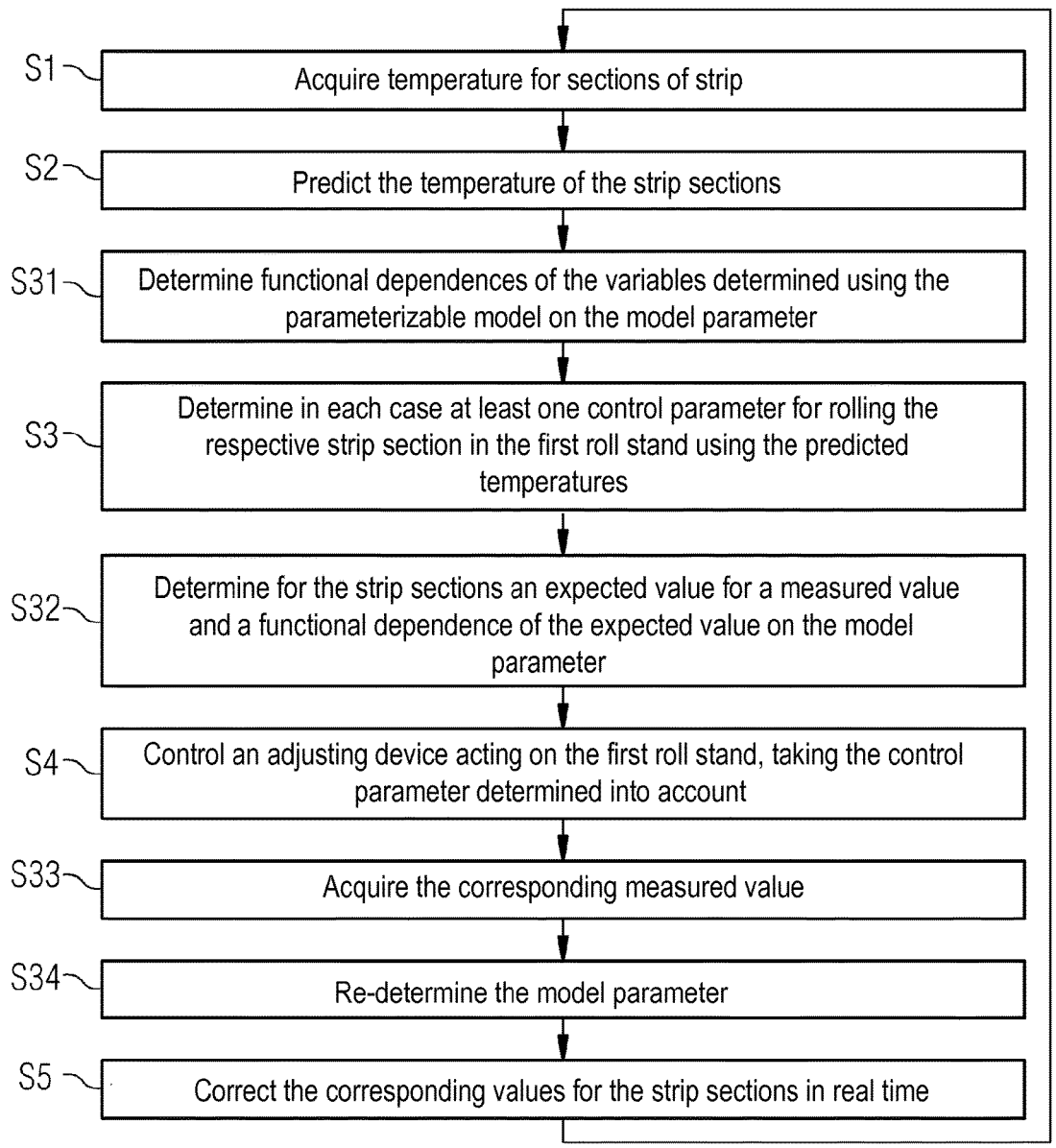
FIG. 18 shows a flow chart.
Figure 19:
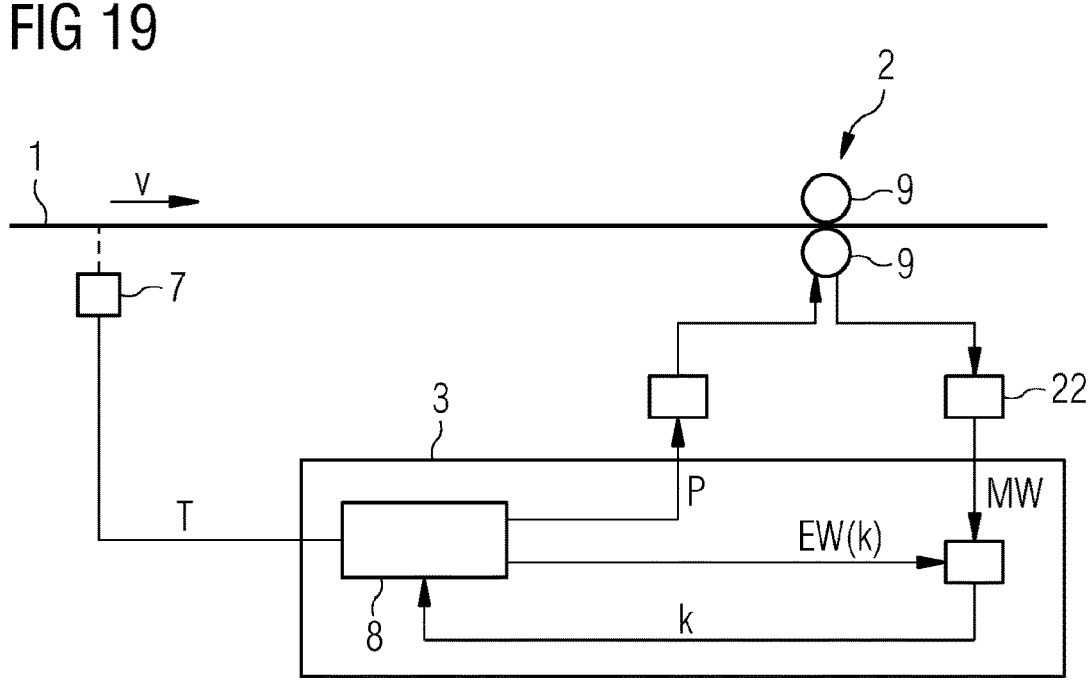
FIG. 19 shows a multi-stand rolling mill train.

As shown in FIG. 18—similarly to FIG. 2—S1 to S4 are present. S1 to S4 can be added to and implemented according to the embodiments in FIGS. 3 to 17. S31 to S35 are additionally present.

In the context of FIG. 18 it is assumed that (at least) one of the models used to determine the at least one control parameter P can be parameterized by a model parameter k. Purely by way of example it will now be assumed that the strip model 8 can be parameterized by the model parameter k. However, this is merely an example. Alternatively, for example, the rolling force model 16, the roll stand model 13, etc. could be parameterized by the model parameter k. A plurality of models can also be parameterizable by a separate model parameter k in each case.

In S31, as shown in FIG. 18, functional dependences of the variables determined directly or indirectly using the parameterizable model 8 on the model parameter k are determined in real time. The variables are in this context the variables which are required directly or indirectly using the parameterizable model 8 to determine the at least one control parameter P. In the course of S31, functional dependences of the required rolling forces F, the occurring thermal camber of the work rolls 9, the material moduli M, etc. can be determined, for example. As it is present in addition to S2 and S3, S31 is additionally carried out to determine the corresponding variables themselves.

In S32, an expected value EW for a measured value MW is determined in real time for the strip sections 6 using the variables determined by the parameterizable model 8—i.e. the variables which are determined anyway as part of FIGS. 2 to 17 using the parameterizable model 8. A functional dependence of the expected value EW on the model parameter k is additionally determined in S32. The expected value EW can be—for example—the rolling force F with which the corresponding strip section 6 is likely to be rolled, a temperature or a tension distribution in the strip 1.

In S33, the corresponding measured value MW for the respective strip section 6 is acquired in real time by a corresponding measuring device 22. The measuring device 22 can be disposed downstream of the first roll stand 2—e.g. for thickness, tension or temperature measurement (if necessary spatially resolved in the strip width direction). Alternatively, the measuring device 22 can be disposed upstream of the first roll stand 2—e.g. for temperature or tension measurement (if necessary spatially resolved in the strip width direction). As a further alternative, the measuring device 22 can be disposed on the first roll stand 2 itself—e.g. for rolling force or position determination.

In S34, the model parameter k is re-determined on the basis of the measured value MW, the associated expected value EW and the functional dependence of the expected value EW on the model parameter k, i.e. the corresponding model 8 is re-parameterized, i.e. the corresponding model 8 is adapted. For calculations performed by the parameterizable model 8 following adaptation of the parameterizable model 8, the new, updated model parameter k is used.

In S35, the control computer 3 adjusts the corresponding variables in real time for the strip sections 6 whose temperatures T have already been determined and whose expected temperatures T' and the corresponding control parameters P have already been predicted. The adjustment is possible because the functional dependences on the model parameter k are known.

The present invention has many advantages. In particular, it is easy to implement, operates reliably and delivers superior results.

The above description serves only to explain the present invention. However, the scope of protection sought for the present invention shall be determined solely by the accompanying claims, including variations and modifications that can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A control method for a rolling mill train, comprising:
    determining actual temperatures of strip sections of a strip upstream of a first roll stand of the rolling mill train;
    obtaining predicted temperatures of the strip sections for a time of rolling of a respective strip section in the first roll stand by a strip model based on the actual temperatures using a first prediction horizon which corresponds to a plurality of strip sections to be rolled in the first roll stand;
    predicting a roll gap profile, formed by the work rolls of the first roll stand when the respective strip section is rolled, for the first roll stand by a roll stand model using the predicted temperatures of the strip sections and a manipulated variable characteristic that influences the roll gap profile, for the strip sections corresponding to the first prediction horizon;
    optimizing the manipulated variable characteristic for the first prediction horizon based on the roll gap profile for the strip sections and a respective setpoint profile;
    determining at least one control parameter for rolling of the respective strip section in the first roll stand using the predicted temperatures of the strip sections, based on a current value of the optimized manipulated variable characteristic; and
    controlling an adjusting device acting on the first roll stand during rolling of the respective strip section taking the at least one control parameter into account, the adjusting device including an operator-side roll gap control system influencing the roll gap on an operator side of the first roll stand and a drive side roll gap control system influencing the roll gap on a drive side of the first roll stand, said controlling including
        predicting a respective current operator-side material modulus and a respective current drive-side material modulus for the strip sections, using the predicted temperatures for a time of the rolling of the respective strip section in the first roll stand, and
        parameterizing the operator- and drive-side roll gap control system at the time when the respective strip section is rolled in the first roll stand using material moduli corresponding to the control parameters.

2. The control method as claimed in claim 1,
    further comprising predicting a rolling force required for rolling the respective strip section in the first roll stand by a rolling force model using at least the predicted temperatures for the strip sections corresponding to the first prediction horizon, and
    wherein the roll gap profile is predicted by the roll stand model using the predicted rolling force from the rolling force model.

3. The control method as claimed in claim 2, wherein the adjusting device comprises a roll cooling device controlled in a spatially resolved manner in a strip width direction.

4. The control method as claimed in claim 3,
    wherein the control method is also carried out for a second roll stand downstream of the first roll stand of the rolling mill train using a second prediction horizon, and
    wherein the strip sections are rolled from a first entry thickness to a first exit thickness in the first roll stand and from a second entry thickness to a second exit thickness in the second roll stand.

5. The control method as claimed in claim 4, wherein at least one of the first exit thickness and the second entry thickness is determined on a strip section specific basis.

6. The control method as claimed in claim 5, wherein the second prediction horizon is dimensioned such that during the second prediction horizon a plurality of strip sections are rolled both in the first roll stand and in the second roll stand.

7. The control method as claimed in claim 1,
    wherein the strip model includes a material model by which an expectable material property other than the temperature is predicted for the strip sections to be rolled in the first roll stand for the time of rolling of the respective strip section in the first roll stand, and wherein the predicted material properties are taken into account in determining the at least one control parameter.

8. The control method as claimed in claim 7, wherein the temperatures of the strip sections predicted by the strip model are spatially resolved in the strip width direction.

9. The control method as claimed in claim 8, wherein the temperatures determined for the strip sections are spatially resolved in the strip width direction.

10. The control method as claimed in claim 9,
further comprising parameterizing at least one of the strip model and another model used as part of determining the at least one control parameter, based on a model parameter, as a parameterizable model,
wherein said determining of the at least one control parameter uses the parameterizable model to determine variables and functional dependences of the variables based on the model parameter in real time,
further comprising determining an expected value for a measured value and a functional dependence of the expected value on the model parameter for the strip sections in real time using the variables determined by the parameterizable model,
wherein measured values of the strip sections are respectively determined in real time by a measuring device disposed one of upstream, on and downstream of the first roll stand, further comprising:
re-determining the model parameter based on one of the measured values, the expected value and the functional dependence of the expected value on the model parameter,
re-parameterizing the parameterizable model based on a re-determined model parameter, and
adjusting the variables already determined for the strip sections in real time as part of determining the at least one control parameter using the parameterizable model.

11. A non-transitory computer readable medium embodying machine code directly executable by a control computer for a rolling mill train which causes the control computer to carry out a control method comprising:
determining actual temperatures of strip sections of a strip upstream of a first roll stand of the rolling mill train;
obtaining predicted temperatures of the strip sections for a time of rolling of a respective strip section in the first roll stand by a strip model based on the actual temperatures using a first prediction horizon which corresponds to a plurality of strip sections to be rolled in the first roll stand;
predicting a roll gap profile, formed by the work rolls of the first roll stand when the respective strip section is rolled, for the first roll stand by a roll stand model using the predicted temperatures of the strip sections and a manipulated variable characteristic that influences the roll gap profile, for the strip sections corresponding to the first prediction horizon;
optimizing the manipulated variable characteristic for the first prediction horizon based on the roll gap profile for the strip sections and a respective setpoint profile;
determining at least one control parameter for rolling of the respective strip section in the first roll stand using the predicted temperatures of the strip sections, based on a current value of the optimized manipulated variable characteristic; and
controlling an adjusting device acting on the first roll stand during rolling of the respective strip section taking the at least one control parameter into account, the adjusting device including an operator-side roll gap control system influencing a roll gap on an operator side of the first roll stand and a drive side roll gap control system influencing the roll gap on a drive side of the first roll stand, said controlling including
predicting a respective current operator-side material modulus and a respective current drive-side material modulus for the strip sections, using the predicted temperatures for a time of the rolling of the respective strip section in the first roll stand; and
parameterizing the operator-side roll gap control system and the drive-side roll gap control system at the time when the respective strip section is rolled in the first roll stand using material moduli corresponding to the at least one control parameter.

12. A control computer for a rolling mill train, comprising:
an adjusting device, acting on a first roll stand of the rolling mill train during rolling of a respective strip section, the adjusting device including an operator-side roll gap control system influencing a roll gap on an operator side of the first roll stand and a drive side roll gap control system influencing the roll gap on a drive side of the first roll stand; and
at least one processor programmed to perform a control method during ongoing operation that includes
determining actual temperatures of strip sections of a strip upstream of the first roll stand of the rolling mill train;
obtaining predicted temperatures of the strip sections for a time of rolling of the respective strip section in the first roll stand by a strip model based on the actual temperatures using a first prediction horizon which corresponds to a plurality of strip sections to be rolled in the first roll stand;
predicting a roll gap profile, formed by the work rolls of the first roll stand when the respective strip section is rolled, for the first roll stand by a roll stand model using the predicted temperatures of the strip sections and a manipulated variable characteristic that influences the roll gap profile, for the strip sections corresponding to the first prediction horizon;
optimizing the manipulated variable characteristic for the first prediction horizon based on the roll gap profile for the strip sections and a respective setpoint profile;
determining at least one control parameter for rolling of the respective strip section in the first roll stand using the predicted temperatures of the strip sections, based on a current value of the optimized manipulated variable characteristic; and
controlling an adjusting device acting on the first roll stand during rolling of the respective strip section taking the at least one control parameter into account, including
predicting a respective current operator-side material modulus and a respective current drive-side material modulus for the strip sections, using the predicted temperatures for a time of the rolling of the respective strip section in the first roll stand, and
parameterizing the operator-side roll gap control system and the drive-side roll gap control system at the time when the respective strip section is rolled in the first roll stand using material moduli corresponding to the at least one control parameter.

13. A rolling mill train for rolling a strip, comprising:

a first roll stand;

an adjusting device, acting on the first roll stand of the rolling mill train during rolling of a respective strip section, the adjusting device including an operator-side roll gap control system influencing a roll gap on an operator side of the first roll stand and a drive side roll gap control system influencing the roll gap on a drive side of the first roll stand; and a control computer programmed to perform a control method during ongoing operation that includes determining actual temperatures of strip sections of a strip upstream of a first roll stand of the rolling mill train;

obtaining predicted temperatures of the strip sections for a time of rolling of a respective strip section in the first roll stand by a strip model based on the actual temperatures using a first prediction horizon which corresponds to a plurality of strip sections to be rolled in the first roll stand;

predicting a roll gap profile, formed by the work rolls of the first roll stand when the respective strip section is rolled, for the first roll stand by a roll stand model using the predicted temperatures of the strip sections and a manipulated variable characteristic that influences the roll gap profile, for the strip sections corresponding to the first prediction horizon;

optimizing the manipulated variable characteristic for the first prediction horizon based on the roll gap profile for the strip sections and a respective setpoint profile;

determining at least one control parameter for rolling of the respective strip section in the first roll stand using the predicted temperatures of the strip sections, based on a current value of the optimized manipulated variable characteristic; and controlling an adjusting device acting on the first roll stand during rolling of the respective strip section taking the at least one control parameter into account, including predicting a respective current operator-side material modulus and a respective current drive-side material modulus for the strip sections, using the predicted temperatures for a time of the rolling of the respective strip section in the first roll stand, and parameterizing the operator-side roll gap control system and the drive-side roll gap control system at the time when the respective strip section is rolled in the first roll stand using material moduli corresponding to the at least one control parameter.

* * * * *